Sept. 27, 1966   M. J. WRIGHT   3,275,855
POWER CONTROL CIRCUITS

Filed Sept. 9, 1963

2 Sheets-Sheet 1

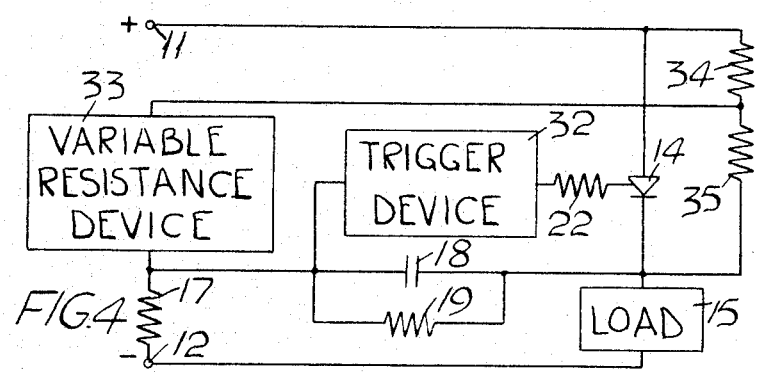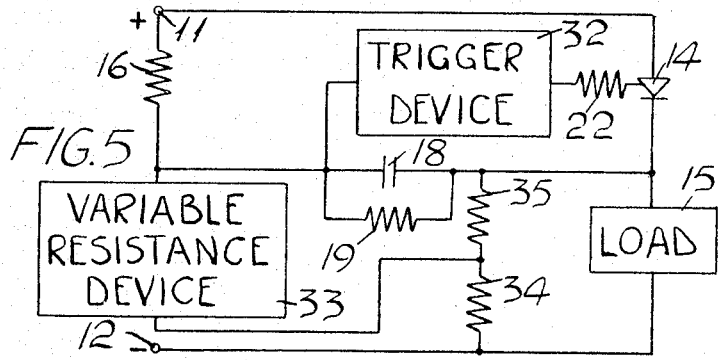

_United States Patent Office_ 3,275,855
Patented Sept. 27, 1966

3,275,855
POWER CONTROL CIRCUITS
Maurice James Wright, Harborne, Birmingham, England, assignor to Joseph Lucas (Industries) Limited, Birmingham, England
Filed Sept. 9, 1963, Ser. No. 307,649
Claims priority, application Great Britain, Oct. 10, 1962, 38,319/62
7 Claims. (Cl. 307—139)

In my application No. 222,382 and now Patent No. 3,206,696 there is described and claimed an oscillator comprising in combination a switchable rectifier having its anode and cathode adapted for connection to a voltage source and its gate adapted for connection to a voltage of magnitude intermediate the voltage applied to the anode and cathode respectively, a load in the anode-cathode circuit of the switchable rectifier, and a capacitor or inductor in the cathode-gate circuit of the switchable rectifier, the arrangement being such that in use the switchable rectifier will be successively switched on and off and the voltage across the load will be of substantially square-wave form.

The present invention relates to a modification of such an oscillator whereby it is adapted for use as a power control circuit.

A power control circuit according to the invention comprises in combination a pair of terminals for connection to a D.C. source, a switchable rectifier having its anode and cathode connected to the pair of terminals respectively, a load in the cathode circuit of the switchable rectifier, a circuit interconnecting the gate and cathode of the switchable rectifier and including a capacitor discharging of which effects switching on and off of the switchable rectifier, and switch means for controlling charging of the capacitor.

In the accompanying drawings, FIGURES 1 to 5 respectively are circuit diagrams illustrating five examples of the invention.

Figure 1:
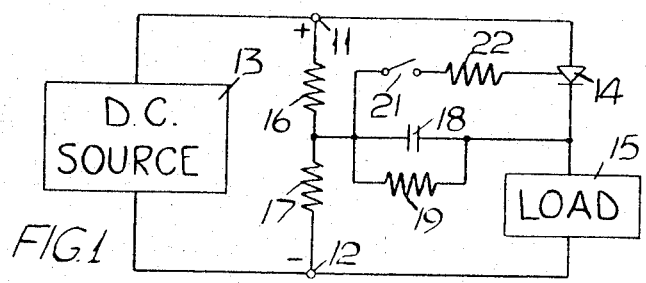

Referring first to FIGURE 1, there are provided terminals 11, 12 for connection to a D.C. source 13 so as to be positive and negative in use respectively. The terminal 11 is connected to the anode of a switchable rectifier 14 having its cathode connected through a load 15 to the terminal 12, and moreover the terminals 11, 12 are bridged by resistors 16, 17 in series. A point intermediate the resistors 16, 17 is connected to the cathode through a capacitor 18 bridged by a resistor 19, and to the gate through a normally open switch 21 in series with a resistor 22.

In use, when the recitifier 14 is non-conductive the capacitor 18 is charged through the resistor 16 and the load 15. On closing the switch 21 momentarily, the capacitor 18 discharges through the gate-cathode circuit to switch on the switchable rectifier 14. The potential at the cathode of the rectifier 14 is now substantially the same as the potential at terminal 11, and the capacitor is charged to the opposite polarity through the switchable rectifier 14 and the resistor 17, so that re-closing of the switch 21 permits discharge of the capacitor to switch off the switchable rectifier 14. The resistor 19 limits the voltage to which the capacitor charges and so limits the required voltage rating of the switch 21.

Figure 2:
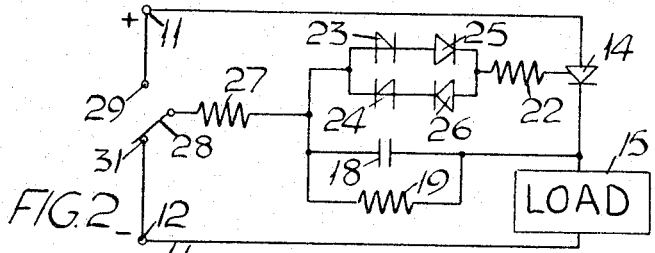

In the example shown in FIGURE 2, the switch 21 is replaced by a pair of oppositely-acting four-layer diodes 23, 24 connected in parallel circuits which in addition contain diodes 25, 26 respectively. Moreover, the resistors 16, 17 are omitted and the point previously connected to the resistors 16, 17 is connected through a resistor 27 to a movable switch contact 28 which can be movable alternatively into contact with contact pieces 29, 31 connected to the terminals 11, 12 respectively.

Movement of the switch contact to the alternative positions switches the switchable rectifier on or off, the capacitor being charged until one of the four-layer diodes 23, 24 breaks down. Although the switch 21 is not employed in this example, the resistor 19 is retained to prevent charging of the capacitor by stray currents.

The four-layer diodes used in FIGURE 2 are Shockley diodes, which break down at a predetermined voltage in the forward direction but do not conduct in the reverse direction. However, such diodes do have a reverse breakdown voltage, and the diodes 25, 26 are included to prevent them from being exceeded. The diodes 25, 26 will not always be necessary; depending on the application, one or both of them may be omitted.

It will be appreciated that the type of four-layer diode which is termed a dynistor could be used in this circuit. This device has a low impedance for one direction of current flow whilst exhibiting a reverse breakdown characteristic in the opposite direction. The diodes 25, 26 would both be essential where dynistors are employed, and would be connected in a manner to prevent flow of current through the dynistors in the forward direction. There are also other semi-conductor devices which could be used in place of the diodes 23, 24. For example, each four-layer diode could be replaced by a three-layer trigger device sold by Texas Instruments and labelled type T.I.42. Such a device is functionally equivalent to a Shockley diode. The Texas Instruments three-layer device type T.I.43 has similar forward and reverse breakdown voltages, and one of these devices could replace both four-layer diodes, the diodes 25, 26 being unnecessary in this case.

Any of the arrangements of four or three layer devices described above can be used in the remaining figures, and the various possibilities are indicated by the generic term "trigger device", which is also used in the claims to cover all the possibilities described above.

Figure 3:
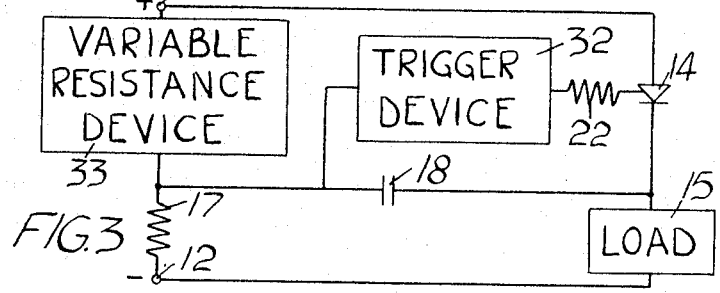

Referring to the example shown in FIGURE 3, the circuit is similar to that shown in FIGURE 1 except that the switch 21 is replaced by the trigger device 32, and the resistor 16 is replaced by a variable resistance device 33. The resistor 19 is not required. The device 33 may take a variety of forms provided that its resistance can be varied from a very high value to a very low value. For example, the device could simply be a switch, or it could be a photocell or transistor. The arrangement is such that when the resistance of the device 33 is low the capacitor 18 is charged in a direction to switch the rectifier 14 on, but when the resistance of the device 33 is high the capacitor is charged in a manner to switch the rectifier 14 off. The resistor 27 seen in FIGURE 2 could be incorporated in FIGURE 3 and the remaining figures to limit the charging current. The resistor 27 is essential where the device 33 is a switch or other device the impedance of which can fall to zero.

In the circuit of FIGURE 3 it is necessary to ensure that switching occurs only when the resistance of the device 33 is at the high and low values, and that oscillations do not occur for intermediate resistance values which are possible when the device 33 is constituted by, for example, a photocell. Oscillations can be avoided if the sum of the breakdown voltages of the device 32 in opposite directions exceeds the supply voltage, but in many cases this is not convenient. The problem can be overcome by modifying the circuit as shown in FIGURE 4, in which the device 33 is not connected directly to the terminal 11, but is connected to a point intermediate a pair of resistors 34, 35 connected in series between the terminal 11 and the cathode of the rectifier 14. The values of the resistors are chosen so that the rectifier 14 is only switched on when the resistance of the device 33 is below a predetermined value, and is only switched off again when the resistance of the device 33 is above a second predetermined higher value. Under these circumstances no oscillations can occur. In one instance a 400 volt supply was used with a device 33 comprising a pair of four-layer diodes of breakdown voltage 20 volts. The values of the resistors 17, 19, 34 and 35 in ohms were 220K, 22K, 47K and 3.9K. The rectifier 14 was switched on when the resistance of the device 33 fell below 10K ohms, and switched off when the resistance of the device rose above 22K ohms.

Both FIGURE 3 and FIGURE 4 can be modified so that the rectifier 14 is switched on and off when the resistance of the device 33 is high and low respectively. In FIGURE 3, the device 33 would be replaced by the resistor 16 (FIGURE 1) and the resistor 17 replaced by the device 33. The modified form of FIGURE 4 is shown in FIGURE 5.

Where the device 33 is a transistor or other device in which the output current is substantially independent of the voltage between the output terminals, the additional circuitry of FIGURES 4 and 5 is not necessary to prevent oscillations. Any risk of oscillations can be prevented by including the resistor 19 in the circuit and choosing its resistance so that switching can only occur when the transistor is conductive or non-conductive. If desired, the resistors 17 in FIGURES 3 and 4 and the resistor 16 in FIGURE 5 could be replaced by constant current sources.

Having thus described my invention what I claim as new and desire to secure by Letters Patents is:

1. A power control circuit comprising in combination a pair of terminals for connection to a D.C. source, a switchable rectifier having its anode and cathode connected to the pair of terminals respectively, a load in the cathode circuit of the switchable rectifier, a capacitor discharging of which effects switching on and off of the switchable rectifier, switch means for controlling charging of said capacitor, said switch means being connectible alternatively to said pair of terminals and being connected to the cathode of said switchable rectifier through said capacitor, and a trigger device through which said switch means is connected to the gate of said switchable rectifier.

2. A power control circuit comprising in combination a pair of terminals for connection to a D.C. source, a switchable rectifier having its anode and cathode connected to the pair of terminals respectively, a load in the cathode circuit of the switchable rectifier, a resistor and a variable resistance device connected in series between said pair of terminals, a capacitor discharging of which effects switching on and off of the switchable rectifier, said capacitor being connected between the cathode of said switchable rectifier and a point intermediate said resistor and said variable resistance device, and a trigger device through which said point intermediate said resistor and said variable resistance device is connected to the gate of said switchable rectifier.

3. A circuit as claimed in claim 2 in which the resistor is constituted by a constant current-device.

4. A circuit as claimed in claim 2 in which the variable resistance device is connected to one of the pair of terminals through a second resistor, a point intermediate the resistance device and second resistor being connected to the cathode of the switchable rectifier through a third resistor, and a fourth resistor being connected across the capacitor, the arrangement being such that the switchable rectifier is switched from one state to the other when the resistance of the variable resistance device falls below a predetermined value, and is switched back to its original state only when the resistance of the variable resistance device rises above a second and higher predetermined value.

5. A power control circuit comprising in combination a pair of terminals for connection to a D.C. source, a switchable rectifier having its anode and cathode connected to the pair of terminals respectively, a load in the cathode circuit of the switchable rectifier, a circuit interconnecting the gate and cathode of the switchable rectifier and including a capacitor discharging of which effects switching on and off of the switchable rectifier, a resistor in parallel with said capacitor, and switch means for controlling charging of the capacitor.

6. A power control circuit comprising in combination a pair of terminals for connection to a D.C. source, a switchable rectifier having its anode and cathode connected to the pair of terminals respectively, a load in the cathode circuit of the switchable rectifier, a circuit interconnecting the gate and cathode of the switchable rectifier and including a resistor in series with the gate of said switchable rectifier, and a capacitor discharging of which effects switching on and off of the switchable rectifier, and switch means for controlling charging of the capacitor.

7. A circuit as claimed in claim 6 including a pair of resistors connected in series between the pair of terminals, the capacitor being connected between the cathode of the switchable rectifier and a point intermediate the resistors, said point being connected to the gate through a series circuit including a normally open switch successive actuations of which switch the switchable rectifier on and off.

References Cited by the Examiner
UNITED STATES PATENTS

| 3,184,665 | 5/1965 | Wright. | |
| 3,197,716 | 7/1965 | Wright et al. | 331—111 |
| 3,206,696 | 9/1965 | Wright | 331—109 |

ORIS L. RADER, *Primary Examiner.*

W. SHOOP, T. B. JOIKE, *Assistant Examiners.*